(12) United States Patent
Cayzer

(10) Patent No.: US 10,166,902 B2
(45) Date of Patent: Jan. 1, 2019

(54) TRAVEL SUPPORT DEVICE

(71) Applicant: Jennifer Cayzer, New South Wales (AU)

(72) Inventor: Jennifer Cayzer, New South Wales (AU)

(*) Notice: Subject to any disclaimer, the term of this patent is extended or adjusted under 35 U.S.C. 154(b) by 129 days.

(21) Appl. No.: 15/037,580

(22) PCT Filed: May 20, 2015

(86) PCT No.: PCT/AU2015/050260
§ 371 (c)(1),
(2) Date: May 18, 2016

(87) PCT Pub. No.: WO2015/176130
PCT Pub. Date: Nov. 26, 2015

(65) Prior Publication Data
US 2016/0280103 A1 Sep. 29, 2016

(30) Foreign Application Priority Data

May 21, 2014 (WO) ............... PCT/AU2014/000533
Aug. 12, 2014 (AU) ............................... 2014903142

(51) Int. Cl.
*B60N 2/90* (2018.01)
*B60N 3/06* (2006.01)
*B64D 11/06* (2006.01)

(52) U.S. Cl.
CPC ............... *B60N 2/995* (2018.02); *B60N 3/06* (2013.01); *B64D 11/0646* (2014.12); *B64D 11/0647* (2014.12)

(58) Field of Classification Search
CPC .... B60N 2/4495; B60N 3/06; B64D 11/0646; B64D 11/0647
See application file for complete search history.

(56) References Cited

U.S. PATENT DOCUMENTS 324,839 A * 8/1885 Hazen .................... A47C 13/00
                                                                                 182/20
400,131 A * 3/1889 Small ........................ A45F 3/22
                                                                                297/232

(Continued)

FOREIGN PATENT DOCUMENTS

| AU | 2013100590 A4 | 5/2013 |
| CH | 703 981 A1 | 4/2012 |
| DE | 295 11 429 U1 | 8/1995 |

OTHER PUBLICATIONS

International Search Report; PCT/AU2015/050260; dated Jun. 22, 2015.

(Continued)

*Primary Examiner* — James M Ference
(74) *Attorney, Agent, or Firm* — Studebaker & Brackett PC

(57) ABSTRACT

A seating support device for use in conjunction with a seat to support a user during travel. The support comprises a main body of flexible material that is capable of being manipulated to alter a three dimensional form of the body into one of multiple usable forms. At least one of the multiple forms is a support form having a recess for a user to rest their leg and/or foot therein. Other forms include a second support form and/or a pouch or carry bag form. An attachment mechanism associated with the body is provided for attaching the body to a support structure separate from a seating surface of the seat in the at least one support form. The body is also configured to couple the seat in use.

20 Claims, 18 Drawing Sheets

(56) References Cited

U.S. PATENT DOCUMENTS

| | | | |
|---|---|---|---|
| 751,425 A | 2/1904 | Bird | |
| 751,452 A * | 2/1904 | Bird | B60N 2/6009 2/69.5 |
| 938,172 A * | 10/1909 | Schulz | A47C 3/029 297/219.1 |
| 1,211,290 A * | 1/1917 | Collins | A41D 13/0015 2/69 |
| 1,423,908 A * | 7/1922 | Burchard | B62B 9/24 2/69 |
| 2,230,689 A * | 2/1941 | Kemp | A47G 9/066 2/69 |
| 2,459,352 A * | 1/1949 | Williams | A47G 9/066 2/69 |
| 2,601,488 A * | 6/1952 | Allen | B60N 2/345 5/94 |
| 2,688,998 A * | 9/1954 | Erickson | B60N 2/6009 297/219.1 |
| 2,712,133 A * | 7/1955 | Coleman | A61G 5/10 2/69 |
| 2,716,239 A * | 8/1955 | Barndollar | A41B 13/06 2/69.5 |
| 2,884,991 A * | 5/1959 | Bloomquist | A47C 7/383 297/377 |
| 2,908,323 A * | 10/1959 | Canzier | B60N 2/62 297/254 |
| 3,329,971 A * | 7/1967 | Shelby | A47C 7/021 2/69 |
| 3,443,066 A * | 5/1969 | Weibel | H05B 3/342 2/69.5 |
| 3,580,633 A * | 5/1971 | Du Priest | A47C 3/16 297/17 |
| 4,142,264 A * | 3/1979 | Whiting | A47G 9/066 2/69.5 |
| 4,217,662 A * | 8/1980 | Buchman | A47G 9/066 2/69.5 |
| 4,258,439 A * | 3/1981 | York | A41D 15/00 2/69.5 |
| 4,502,154 A * | 3/1985 | Itoi | A41D 3/00 2/108 |
| 4,826,242 A * | 5/1989 | Trethewey | A47C 7/021 2/69 |
| 4,943,105 A * | 7/1990 | Kacar | A01K 1/0272 119/28.5 |
| 5,188,421 A * | 2/1993 | Arseneault | B60N 2/28 108/44 |
| 5,283,909 A * | 2/1994 | Hill | A47G 9/066 2/22 |
| 5,556,167 A * | 9/1996 | Johnson Siemion | A47C 16/02 297/423.15 |
| 5,878,672 A * | 3/1999 | Ostermann | B60N 3/004 108/25 |
| 5,970,542 A * | 10/1999 | Mays | A47G 9/066 2/69.5 |
| 6,223,367 B1 * | 5/2001 | French | A45C 3/10 383/4 |
| 6,311,330 B1 * | 11/2001 | Rothman | A47G 9/066 2/69 |
| 6,327,726 B1 * | 12/2001 | Weber | A47D 5/006 297/219.1 |
| 6,832,741 B2 * | 12/2004 | Jarosz | B60N 3/063 244/118.5 |
| 7,036,153 B2 * | 5/2006 | Gibson | A47C 4/52 2/69 |
| 7,108,329 B1 * | 9/2006 | Clough | B60N 3/063 297/423.19 |
| 7,178,185 B1 * | 2/2007 | Nattler | A41D 15/04 2/84 |
| 7,322,655 B1 * | 1/2008 | Williams | A47C 7/52 297/423.15 |
| 7,338,131 B2 * | 3/2008 | Forgatsch | B64D 11/06 297/188.08 |
| 7,581,259 B2 * | 9/2009 | Thompson | A47G 9/066 2/69.5 |
| 7,658,153 B1 * | 2/2010 | Patoka | B60R 11/00 108/152 |
| 2003/0061659 A1 * | 4/2003 | Dunlap | A47G 9/066 5/485 |
| 2005/0097671 A1 * | 5/2005 | Wyman | A47G 9/068 5/482 |
| 2005/0262613 A1 * | 12/2005 | Panek | A41D 3/08 2/89 |
| 2007/0158992 A1 * | 7/2007 | Dowty | B60N 2/62 297/423.19 |
| 2009/0025118 A1 | 1/2009 | Pothier | |
| 2011/0089725 A1 * | 4/2011 | Shantha | B60N 3/06 297/180.1 |
| 2012/0080912 A1 * | 4/2012 | Perera | A47C 7/52 297/188.01 |
| 2012/0292975 A1 * | 11/2012 | Long | B60N 3/06 297/423.15 |
| 2013/0200663 A1 * | 8/2013 | Marsters | A47C 7/52 297/188.2 |
| 2016/0280103 A1 * | 9/2016 | Cayzer | B60N 3/06 |

OTHER PUBLICATIONS

Written Opinion; PCT/AU2015/050260; dated Jun. 22, 2015.
EESR (Extended European Search Report) issued in corresponding EP appln No. 15796483.4 dated Jan. 18, 2018; 3pp.

* cited by examiner

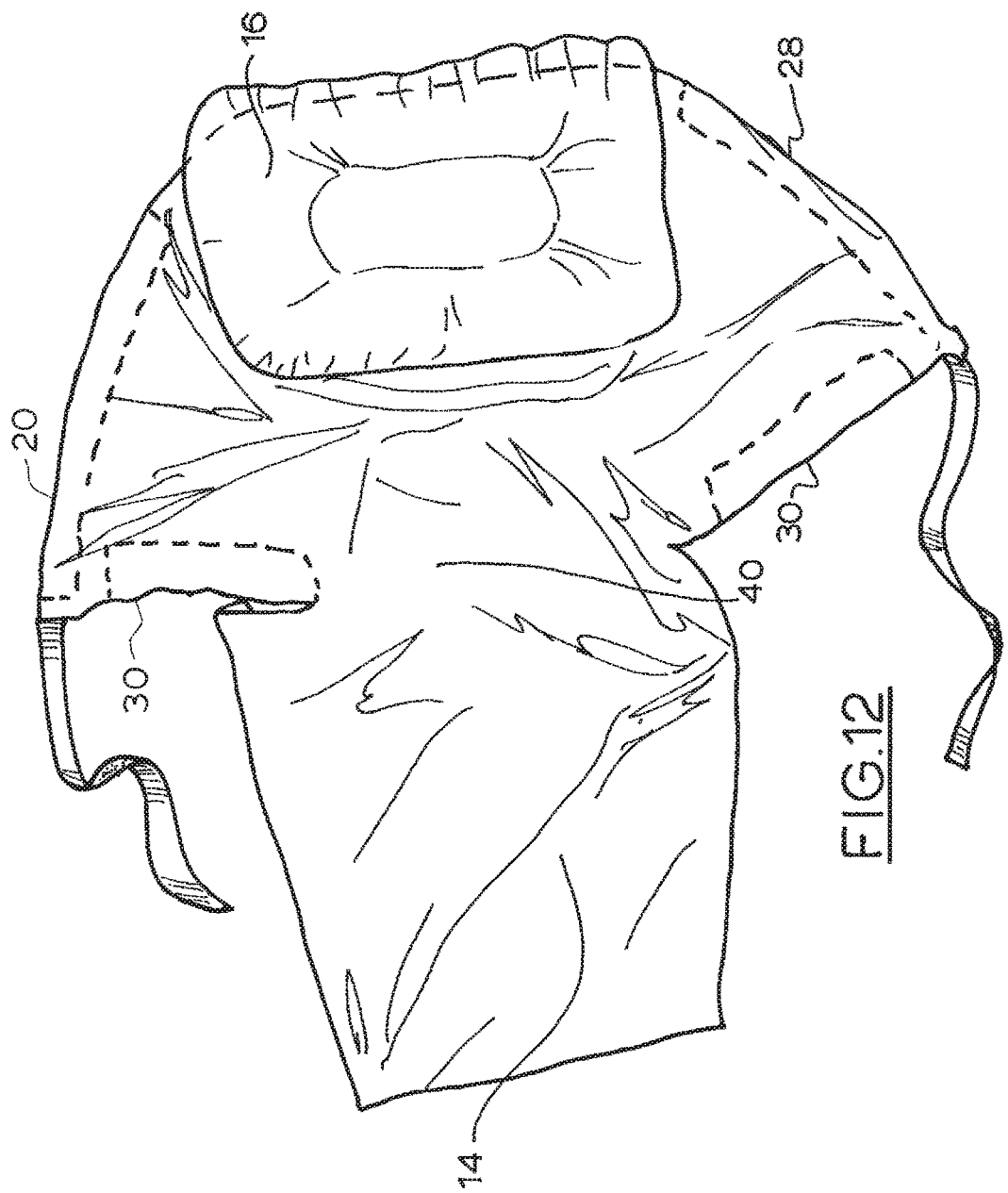

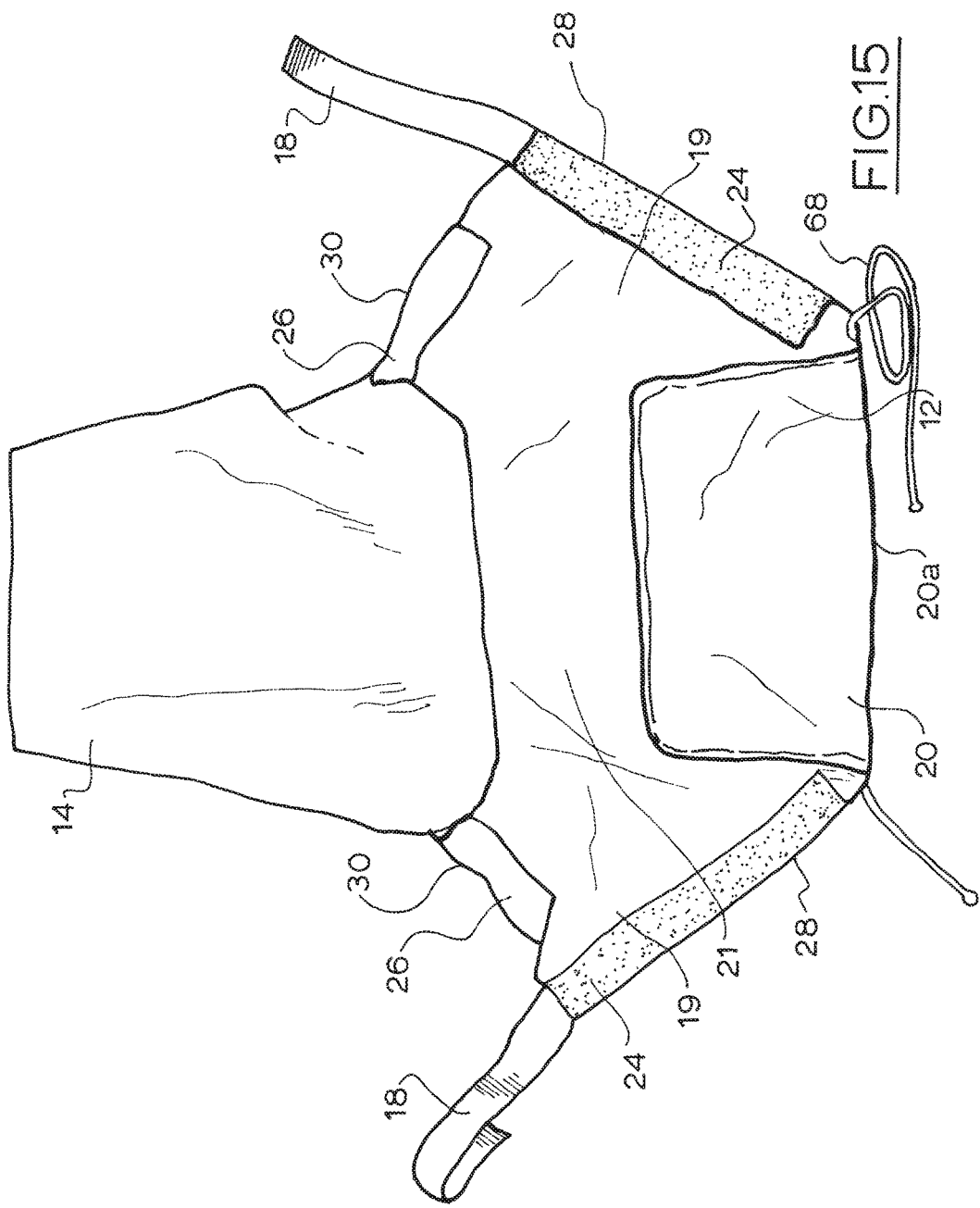

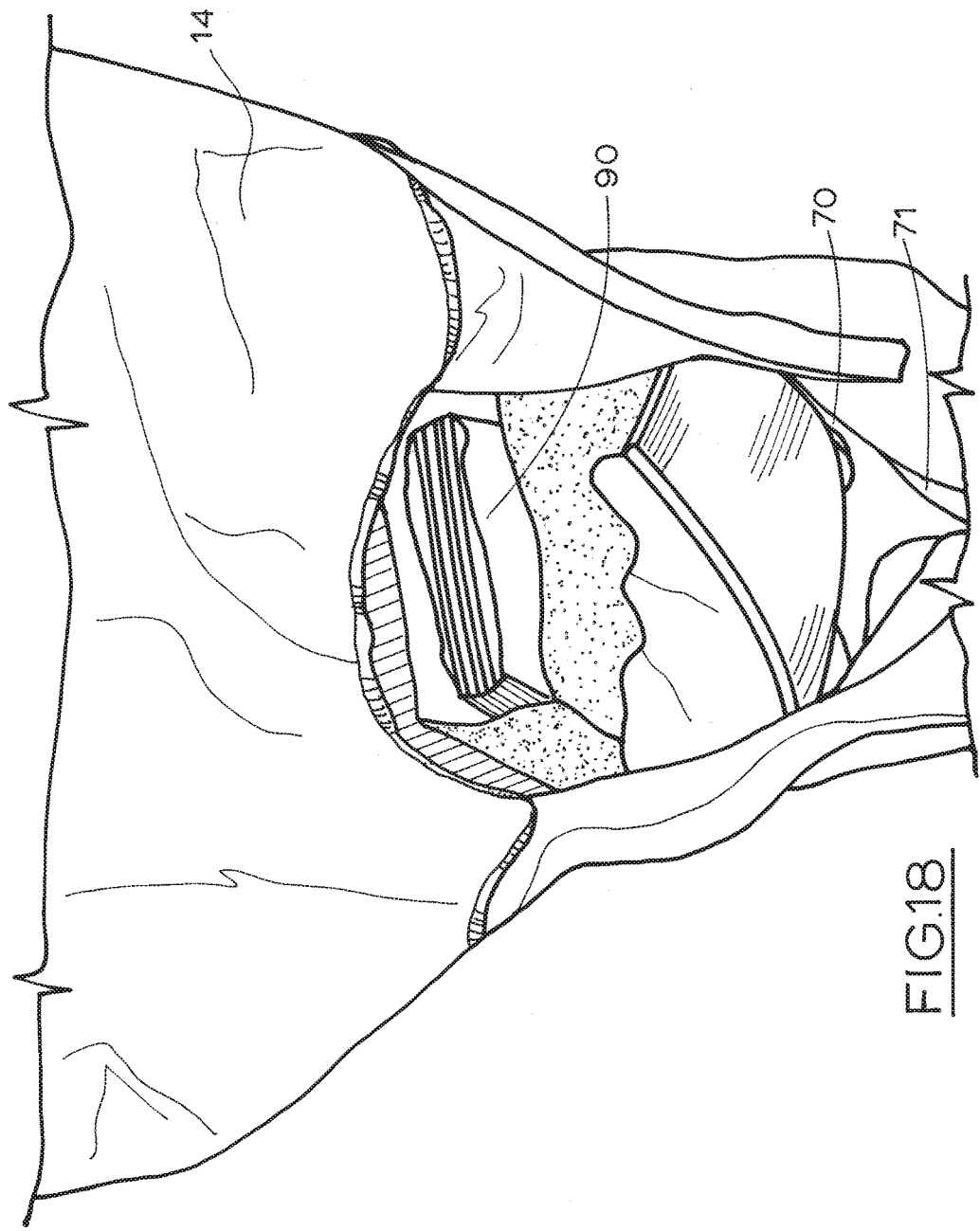

TRAVEL SUPPORT DEVICE

FIELD OF THE INVENTION

This invention relates to supports and in particular to leg and/or foot supports for use in conjunction with a seat during travel.

BACKGROUND OF THE INVENTION

It should be noted that reference to the prior art herein is not to be taken as an acknowledgement that such prior art constitutes common general knowledge in the art.

Travelling has become a very common part of life, whether it is for work, visiting friends or family or for a vacation. People often travel for long periods during which time they are seated in a chair and are generally sedentary. In particular, travelling in airplanes requires a passenger to be seated in a cramped position for many hours. Travelling in trains, buses and the like can also see a passenger seated for long periods of time in awkward and uncomfortable positions.

Sitting for long periods can become very uncomfortable and can lead to tired and aching muscles, swollen legs, deep vein thrombosis (DVT) and even the life threatening condition of pulmonary emboli. Furthermore, it can be difficult to sleep in an upright seated position and travelers can often become sleep deprived. All of these factors make travelling for long periods uncomfortable. Also passengers often require significant recovery time which is detrimental to work commitments or enjoyment of vacation time.

Several devices have been developed in order to make travelling more comfortable and/or to help prevent DVTs. Some such devices include padded or inflatable neck supports, which facilitate sleeping in a chair, and back supports that prevent an aching back. These neck and back supports are useful to provide an alternative position however for many people they do not provide enough comfort to significantly ameliorate the effects mentioned above.

Some passenger chairs in airplanes, trains and buses have the ability to recline partially and/or have an extendible foot rest built into the chair. More commonly, a passenger chair can have a fold down foot rest at the back such that the person sitting in the chair behind can rest their feet on the foot rest however in saying that most airlines have removed their footrests. Personal inflatable foot rests have also been developed which allow a person to take the foot rest with them in different vehicles. It is desirable to be able to raise one's feet and legs to reduce fatigue and pain, to increase blood flow in the venous system and therefore to help prevent DVTs. It is also advantageous to be able to sleep comfortably on your side with legs supported. However, these foot rests only raise the legs by a small distance and for many people do not provide the support required for comfort, improved blood flow or sleeping.

Other devices often used to prevent DVTs include pressure stockings or socks which apply pressure to the ankles and calves to discourage pooling of blood in the veins of the legs. Inflatable leg compression devices have also been used to apply pressure to the legs to prevent pooling of blood in the legs. These compression devices can be uncomfortable and can be cumbersome or inconvenient if a passenger needs to get up and move around.

Accordingly, it would be advantageous of the present invention to provide a contrivance which ameliorates one or more of the disadvantages set forth above or at least provide the public with a useful choice.

STATEMENTS OF THE INVENTION

In a first aspect the invention may broadly be said to consist of a seating support device for use in conjunction with a seat to support a user during a sitting position in situ, the support comprising:

a main body of flexible material that is capable of being manipulated to alter a three dimensional form of the body into one of multiple usable forms, and wherein the multiple usable forms comprises at least one support form having a recess for a user to rest their leg and/or foot therein, an attachment mechanism associated with the body for attaching the body to a support structure separate from a seating surface of the seat in the at least one support form, and wherein the body is also configured to couple the seat in use.

Preferably the attachment mechanism is configured to couple a support structure is in front of the seat.

Preferably the body comprises a front section having a central body portion and a pair of lateral wings extending from either side of the central body portion, and a tail section extending longitudinally from one end of the central body portion.

Preferably the body comprises an attachment mechanism associated with each lateral wing for coupling the respective wing to the support structure.

Preferably each attachment mechanism comprises a first attachment member associated with the wing configured to couple one of two second attachment members on the wing to form a first connection or a second connection respectively, both connections configured for securely coupling the wing to the support structure in situ.

Preferably a position of the first connection and/or a position of the second connection is adjustable by adjusting a position of the first attachment member relative to the position of either second attachment member.

Preferably the two second attachment members are oriented at an angle relative to one another. More preferably the two second attachment members are respectively positioned along two approximately orthogonal outer edges of the wing.

Preferably the body is capable of being manipulated to alter the three dimensional form of the body between a first support form and a second support form.

Preferably in the first support form the body comprises a recess for retaining a user's foot and/or leg therein and in the second support form the body comprises a recess and an adjacent platform at a relatively higher position than a floor of the recess, wherein the platform is located between the recess and the seat in use.

Preferably in both the first and second support forms the body is configured to couple the support structure at one end via the attachment mechanism associated with each wing and couple the seat at an opposing end via the tail section.

Preferably the tail section is configured to couple the seat via the user sitting on the tail section and the seat.

Preferably the recess of the first and second support forms is bounded by a floor, two opposing side walls and a rear wall. The floor is formed by a front part of the central body portion of the main body, the rear wall is formed by a rear part of the central body portion of the main body, and the opposing side walls are formed by the lateral wing portions of the main body.

Preferably an anterior part of the recess is open.

Preferably the platform of the second support form is formed by an inner end of the tail section adjacent the central body portion.

Preferably the body is adjustable between the first support form and the second support form by adjusting the connection of the attachment mechanism of each wing between the first connection and the second connection.

In one embodiment the main body is capable of being manipulated into a carry bag or pouch form.

Preferably the main body comprises an adjustment mechanism associated with a leading edge of the central body portion of the main body for adjusting a length of the leading edge.

Preferably, in the carry bag or pouch form the main body comprises a pouch bounded by the wing portions and the central body portion.

Preferably in the carry bag or pouch form the tail section can be utilized as a cover by folding the tail section over one or more items to be retained in the pouch.

Preferably the device further comprises a releasable fixing mechanism for releasably coupling respective edges of the wing portions in the carry bag or pouch form.

Preferably the device further comprises a strap for enabling a user to carry the pouch over a shoulder and/or arm of the user in the carry bag or pouch form.

Preferably the main body is formed from a flexible and durable material.

Preferably the body is foldable, rollable or otherwise compactable and the device further comprises a bag for retaining and transporting the compacted body.

Preferably the device is configured for use with a seat of a vehicle, such as a car, bus, train or airplane.

Preferably the device further comprises one or more pillows configured to be supported within the recess or on the platform or both.

Preferably the one or more pillows is/are removable.

In a second aspect the invention may broadly be said to consist of a seating support device for use in conjunction with a seat to support a user during a sitting position in situ, the support comprising:

a main body of flexible material that is capable of being manipulated to alter a three dimensional form of the body into one of multiple usable forms, and wherein one of the forms is a first support form having a recess for a user to rest their leg and/or foot therein and another one of the forms is a second support form having a recess for a user to rest their leg and/or foot therein and a platform adjacent the recess for the user to rest their leg and/or foot thereon, an attachment mechanism associated with the body for attaching the body to a support structure separate from a seating surface of the seat in the at least one support form, and wherein the body is also configured to couple the seat in use.

In a third aspect the invention may broadly be said to consist of a seating support device for use in conjunction with a seat to support a user during a sitting position in situ, the support comprising:

a main body of flexible material that is capable of being manipulated to alter a three dimensional form of the body into one of multiple usable forms, and wherein at least one of the forms is a support form configured to couple the seat and a separate support structure and providing a support surface for a user to rest their foot and/or leg thereon, and at least one of the forms is a carry bag or pouch form having a pouch for receiving and retaining one or more items for transport, an attachment mechanism associated with the body for attaching the body to a support structure separate from a seating surface of the seat in the at least one support form, and wherein the body is also configured to couple the seat in use.

Any one or more of the above embodiments or preferred features can be combined with any one or more of the above aspects.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which:

FIGS. 11 and 12 show plan views of the support device of the first embodiment in an unassembled or spread out state;

FIG. 15 shows a plan view of a support device of a second embodiment in an unassembled or spread out state;

FIGS. 16-20 show a series of view of the support device of FIG. 15 being manipulated into a carry bag or pouch form of the device;

DETAILED DESCRIPTION OF THE INVENTION

The invention comprises a support device for use in conjunction with a seat. The device, in the preferred embodiments is particularly suited for use with vehicle seats, such as cars, buses, coaches, vessels or aircrafts to provide support to a user during short and long travel journeys. The device is preferably portable, easily assembled and compactable as will be described making it particularly well suited for travel applications. Three preferred embodiments of the support device 10 of the invention will be described with reference to the drawings.

Figure 10:
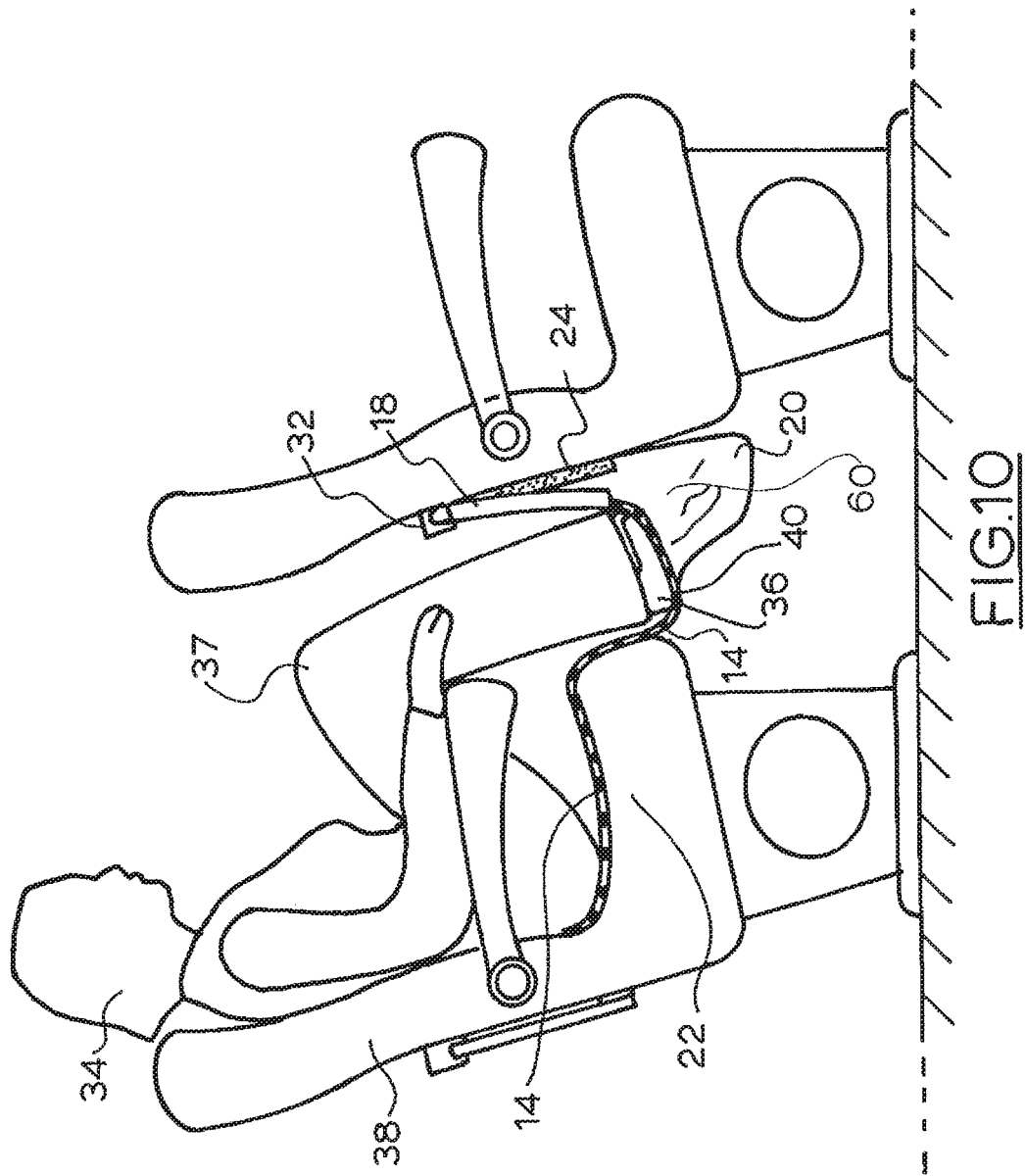
FIG. 10 shows a side view of the support device of FIG. 6 in use.
Figure 11:
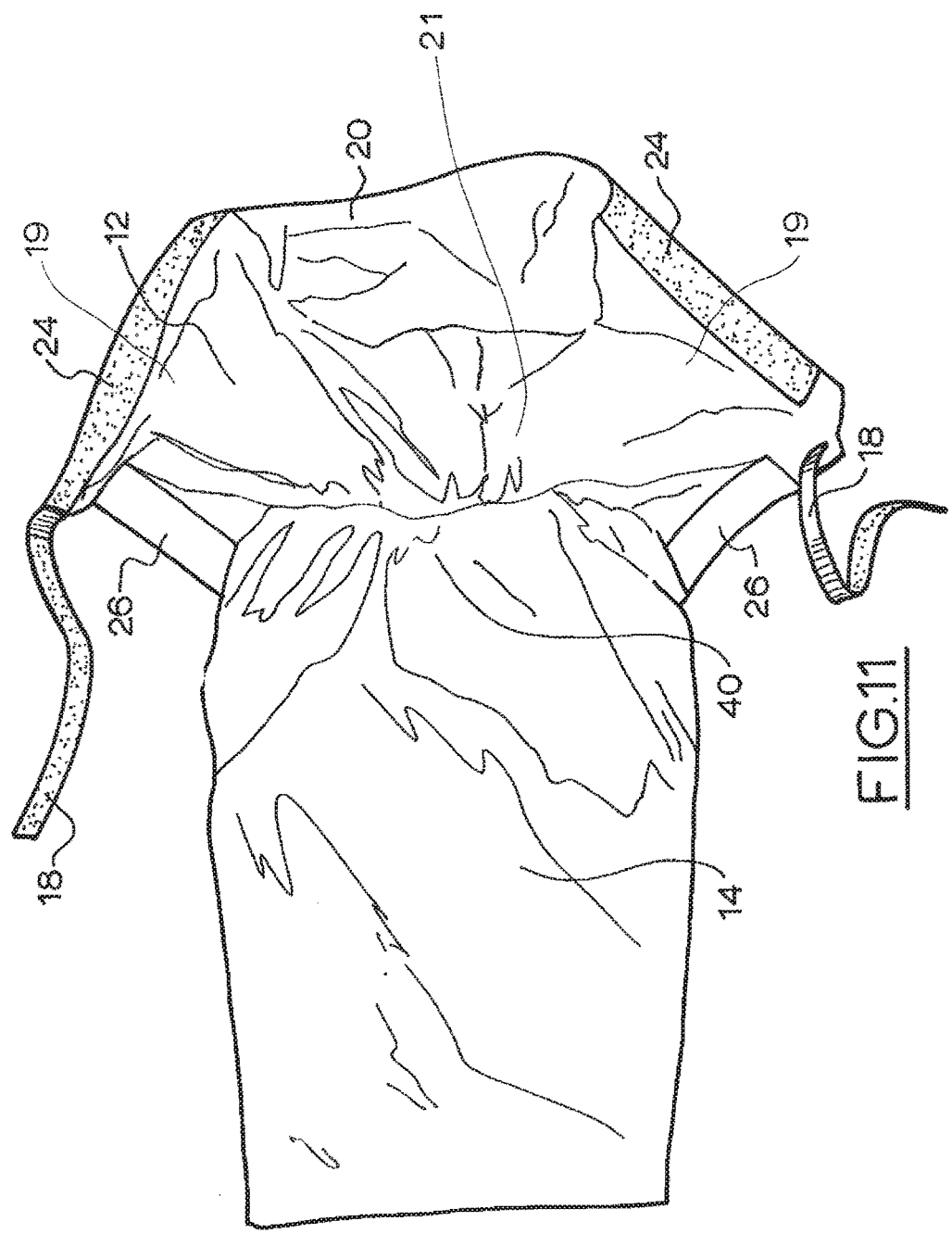

Referring to FIGS. 1 to 13, a first preferred embodiment of a support device 10 for use in conjunction with a seat (in particular a seat of a travel vehicle) is shown. FIGS. 11 and 12 show a main body of the support device 10 in an unassembled or spread out state to illustrate the components of the body. Relative positions of various parts, portions and sections of this main body will now be described with reference to the substantially spread out state.

Figure 1:
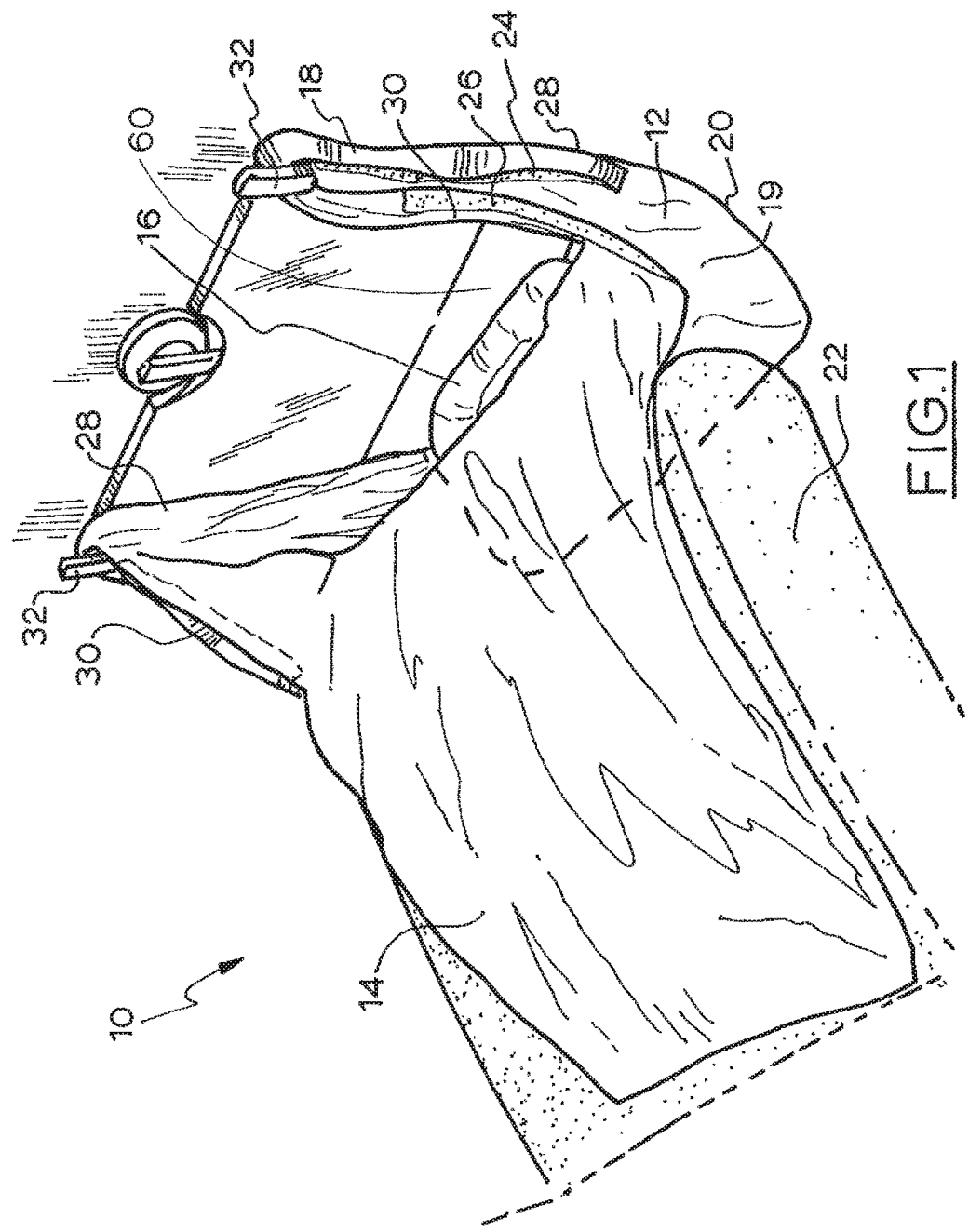
FIG. 1 shows an isometric view of first preferred embodiment of a support device of the invention in a first support form.
Figure 2:
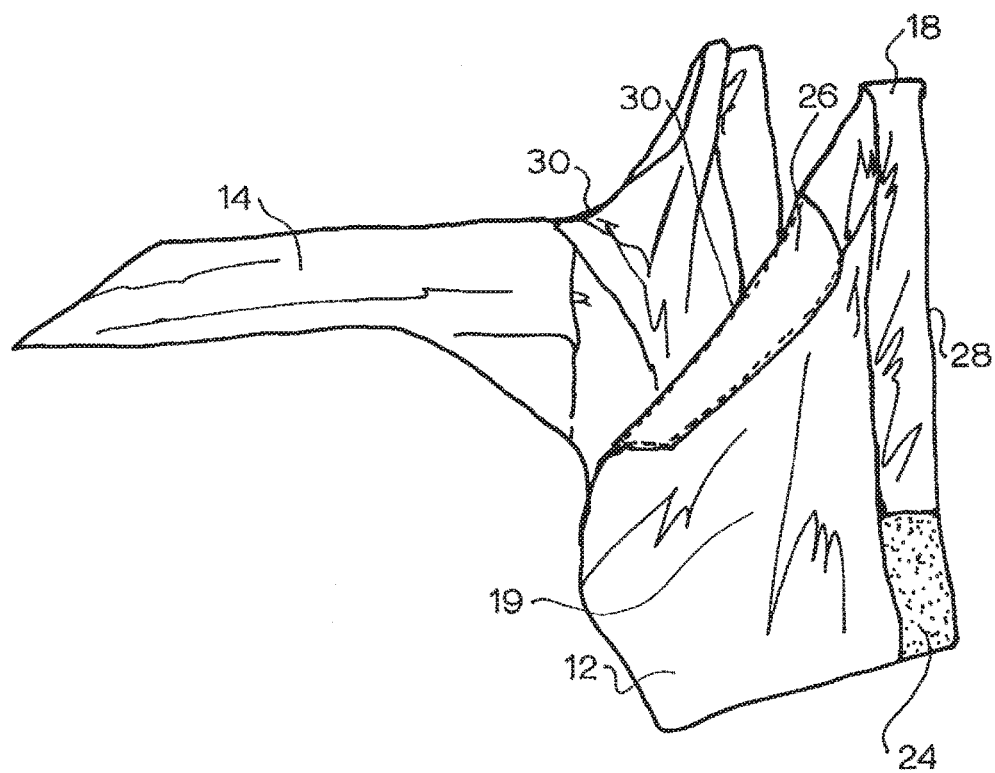
FIG. 2 shows a side view of the support device of FIG. 1.
Figure 3:
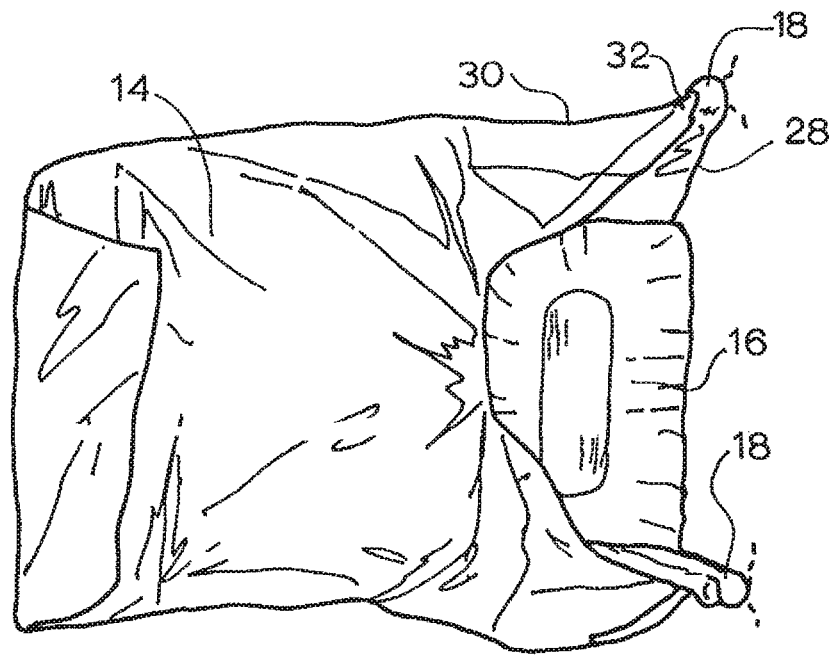
FIG. 3 shows a top view of the support device of FIG. 1.

As shown, the device 10 comprises a main body that is formed from one or more sheets of material to provide a body structure that can be manipulated to adjust a three dimensional form of the body for achieving a support structure in the assembled state (see FIG. 1 for example). The main body of the device 10 comprises a front section 12 having a central body portion and a pair of lateral wing portions 19 extending from either side of the central body portion, and a tail section 14 comprising a length of material extending longitudinally from an end of the central body portion. The central body portion comprises a front part 20 and a rear part 21. The tail section 14 extends from adjacent the rear part 21 of the central body portion. Any one or more of the portions, parts or sections described thus far may be integrally formed, or separately formed or cut and fixedly coupled to one another via sewing/stitching, adhesive or any other suitable coupling means.

The front section 12 is preferably of a greater width (at its widest region) than the tail section 14. The tail section is preferably of a uniform width along its length and of a sufficient length to extend at least along a substantial portion of the seating region of a seat. It will be appreciated that in alternative embodiments the tail section may be non-uniform in width along its length.

Each wing portion 19 comprises a pair of outer edges 28 and 30. The first outer edge 28 extends obtusely from an outer leading edge of the front part 20 and the second outer edge 30 extends from a terminal end of the first edge 28 towards the tail section 14. The outer edges 28 and 30 are preferably approximately orthogonal to one another. Each outer edge 28 and 30 has one or more attachment members 24/26 provided along at least a portion of the length of the edge 28/30. In the preferred embodiment, an attachment member 24 extends along the length of the edge 28 and an attachment member 26 extends along the edge 30 of the wing portion 19, for each wing portion 19. A complementary attachment member in the form of a strap 18 extends adjacent and/or between the members 24 and 26 for interchangeably coupling to one of the members 24 and 26, for each wing portion 19. In the preferred embodiments the attachment members 24, 26 and 18 are part of a hook and loop fastening system but may alternatively couple one another via any other suitable fastening mechanisms known in the art such as buckles, snap-fit engagements and the like. The attachment members 24, 26 and 18 are preferably sewn onto the respective edges 28 and 30 but may be coupled to the wings 19 in any other well-known manner.

In the preferred embodiments, the device may further comprises one or more removable pillows or cushions 16 for use with the device in situ as will be described in further detail below.

The main body of the device 10 is foldable along at least the following regions: at the junction between the tail section 14 and front section 12, at the junctions between each wing portion 19 and the central body portion of the front section 12, and at the junction between the front part 20 and rear part 21 of the central body portion. The main body of the device 10 is at least inwardly foldable at these regions but preferably foldable in either direction. The remaining regions of the device may be substantially rigid and/or less flexible but in the preferred embodiment the entire main body is formed from one or more sheets of durable, high tensile and sheer-strength material that is/are substantially flexible and foldable in various directions and angles. In the preferred embodiment, the main body comprises one or more sheets formed from a plastics material. The main body may comprise one or more sheets formed from a textile fabric in alternative embodiments.

The device 10 is foldable into a three dimensional form or structure suitable for supporting at least a lower body portion of the user. In both the first and second preferred embodiments, the three dimensional form or structure is adjustable into one of multiple forms or structures. In the first preferred embodiment, the main body of the device 10 is adjustable between a first support form or structure and a second support form or structure. In the second preferred embodiment the device is adjustable between at least one support form or structure (most preferably first and second support forms as in the first embodiment) and also adjustable into a carry bag form or structure.

Referring now to FIGS. 1 to 5, a first support form or structure of the main body of the first preferred embodiment of the device 10 is shown. In the first support form, the device 10 comprises an open well or recess 60 configured to receive and retain a user's foot and/or leg therein. The recess 60 comprises a floor 20 and an inner peripheral wall for bounding the user's leg and/or foot therein. The inner wall comprises at least a rear surface but preferably also include one or two side surfaces. In the preferred embodiment, the inner wall is composed of two lateral side walls 19 formed by the lateral wings 19, a rear wall 21 formed by the rear part 21 of the central body portion of the front section 12 and extending approximately orthogonally between the side walls. A floor 20 formed by the front part 20 of the central body portion of the front section 12 extends approximately orthogonally between the side walls and at a lower end of the rear wall 21. The side walls 19 and preferably also the rear wall 21 are of sufficient height in this three dimensional form of the body to extend along at least a substantial portion of the user's lower leg when a user's foot is resting on the floor 20. This provides support to the user's leg as well as their foot enhancing support and increasing the range of possible comfortable seating positions.

In this preferred form the front or anterior part of the recess is substantially open at least adjacent the floor 20 to enable a user to extend their foot and/or leg beyond the recess 60 if desired. The front end of the recess in the preferred embodiment is open from the floor and up substantially along the entire height of the side walls 19. In alternative embodiments the recess 60 is further bounded by a front wall at the anterior part of the recess. The rear wall 21 may extend along the entire height of the side walls 19 but in the preferred embodiment extends along a portion of the height of the side wall 19 from the floor 20. The general orientation of the recess 60 is preferably approximately orthogonal to the general orientation of the seating surface of the user's seat and/or along a plane substantially parallel to the floor of the vehicle.

The tail section 14 extends from the rear wall 21 of the recess 60 and is configured to extend along at least a portion of a seating surface of a user's seat in situ. The tail section 14 is preferably of a length sufficient to extend along a substantial part of the length of the seating surface and of a width sufficient to extend across a substantial part of the width of the seating surface. The tail section 14 is configured to be fixed in position on the seat to form a first anchoring region for the device 10 in situ. In the preferred embodiment, the tail section 14 is configured to be fixed in position on the seat by friction caused by the weight of a user sitting on top of the tail section 14 and seat. Alternatively or in addition one or more attachment members may be provided to the tail section for sufficiently fixing the tail section 14 in position relative to the seat.

The device 10 is configured to couple a support structure separate from a user's seat at an opposing end to the tail section 14. The support structure in some embodiments may be part of the user's seat. The support structure is preferably located in front of a seating surface of a user's seat. Attachment members 18, 24 and 26 associated with the wings/side walls 19 form the second and third anchors by fixing the body at either side of the formed recess 60 to a support structure in front of the user's seat. In the preferred embodiment the attachment member/strap 18 on either side of the recess 60 is configured to loop around a part of the support structure. In one implementation of the preferred embodiment, the support structure is a tray table of a seat in a vehicle such as an aircraft and the attachment members 18 are configured to loop around support arms 32 on either side of the tray table. It will be appreciated that the device 10 is configured for use with many other applications and implementations and is not intended to be limited for use with a tray table structure. In the first support form of the first preferred embodiment, each attachment member is couple to the complementary attachment member 24 of the associated side wall 19. In conjunction with the weight of a user's body part 20 this creates tension along the front edge 28 of each side wall 19 to help maintain an upright recess 60 during use. In the first support form, the upper edge 30 of each side wall 19 is collapsed so not to obstruct a user's body part between the edge of the seating surface and the recess 60 in use.

For further stability non-slip material can is attached to the straps 18 so that when the leg and foot support 10 is in use the non-slip material makes contact with the support structures 32, preventing the straps 18 from slipping. This is particularly useful when the straps 18 are attached to the arms of a tray table on an airplane.

Figure 4:
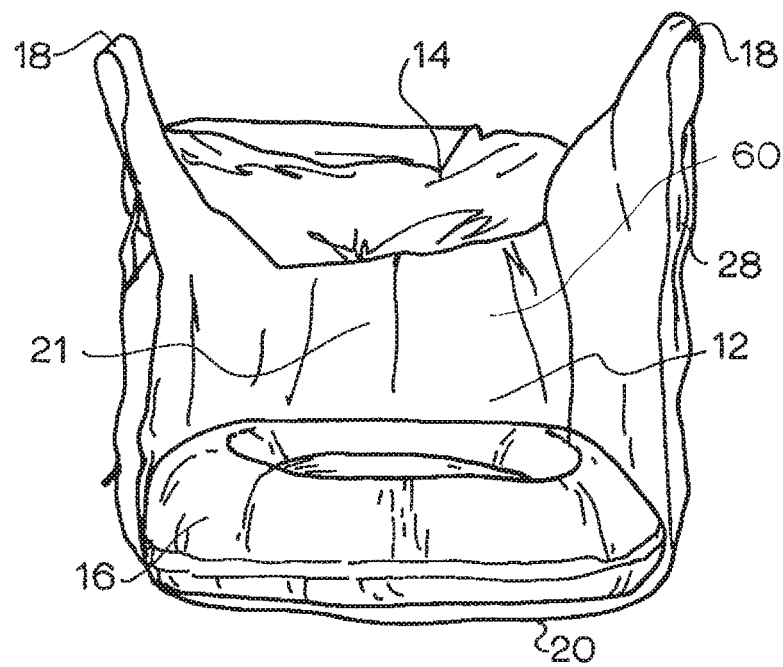
FIG. 4 shows a front view of the support device of FIG. 1.
Figure 5:
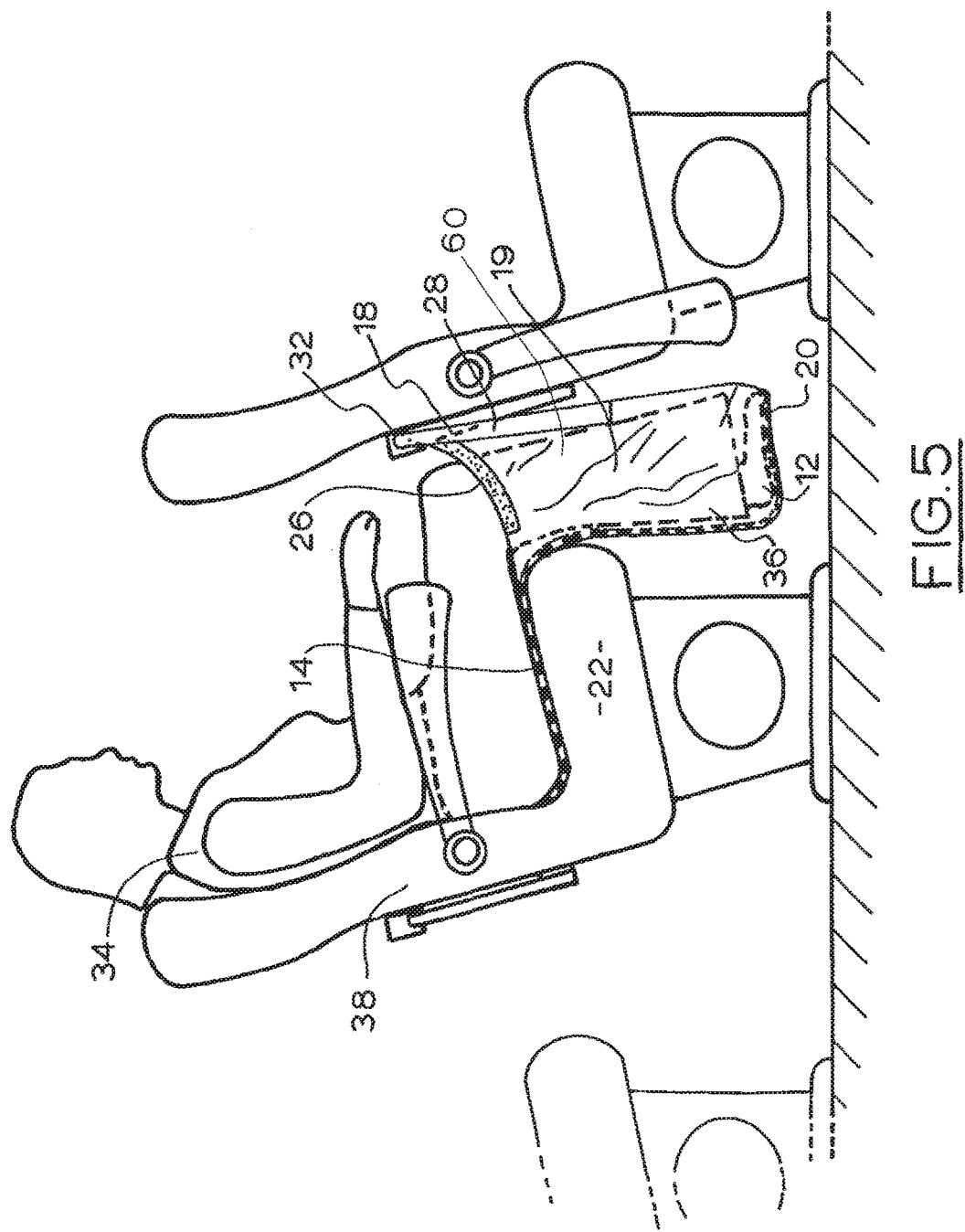
FIG. 5 shows a side view of the of the support device of FIG. 1 in use.
Figure 6:
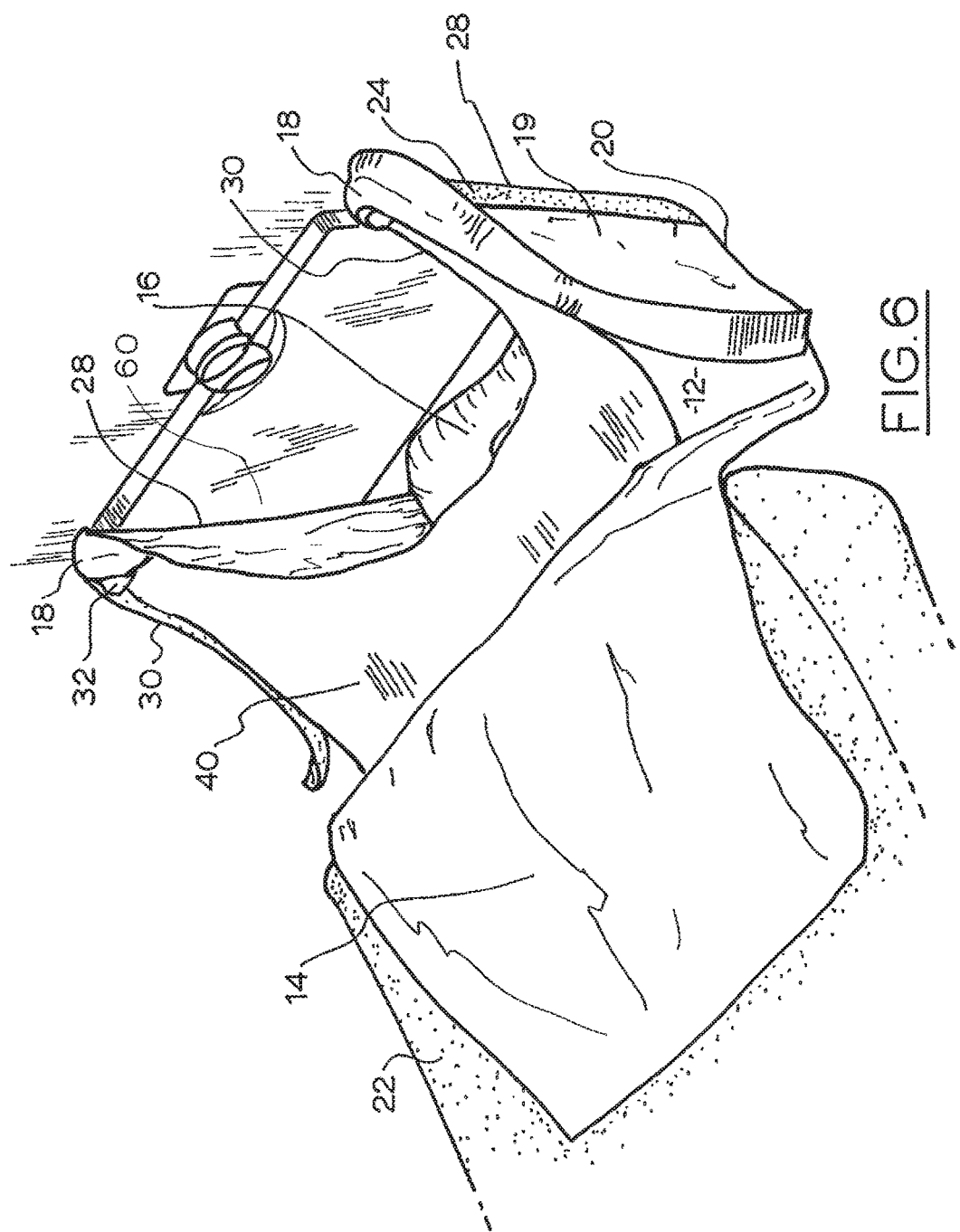
FIG. 6 shows an isometric view of the support device of the first embodiment in a second support form.
Figure 7:
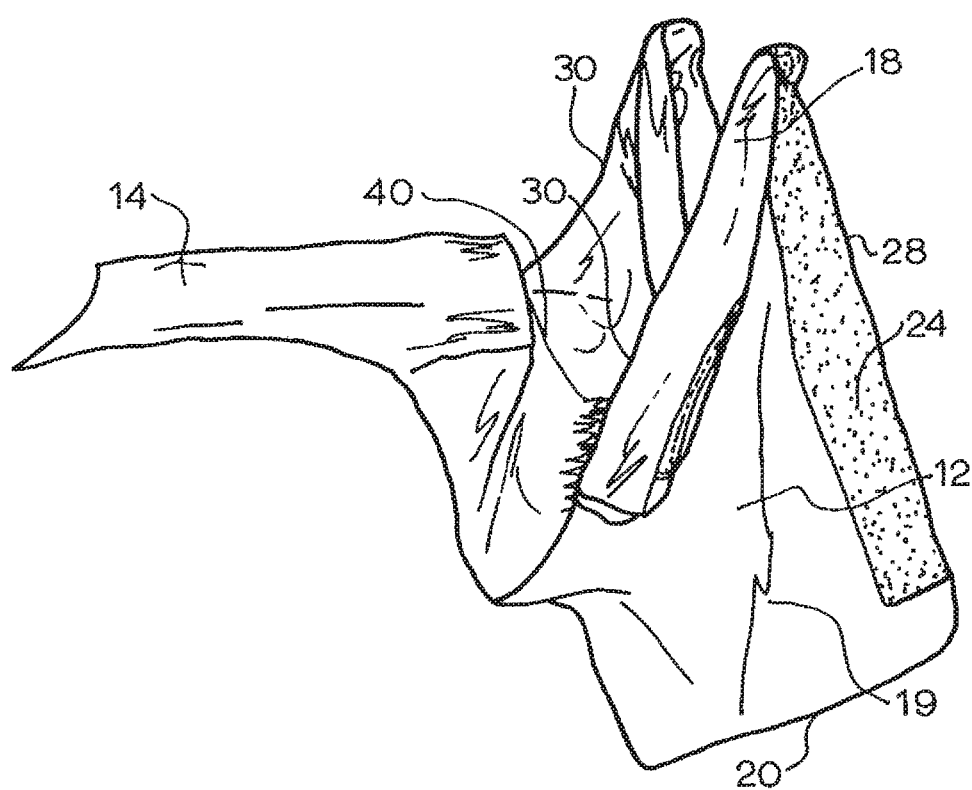
FIG. 7 shows a side view of the support device of FIG. 6.
Figure 8:
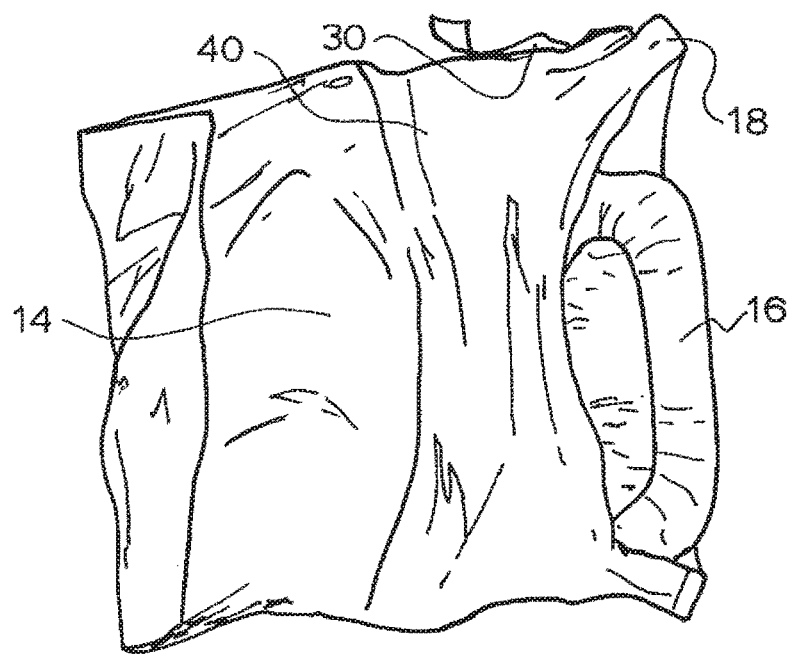
FIG. 8 shows a top view of the support device of FIG. 6.
Figure 9:
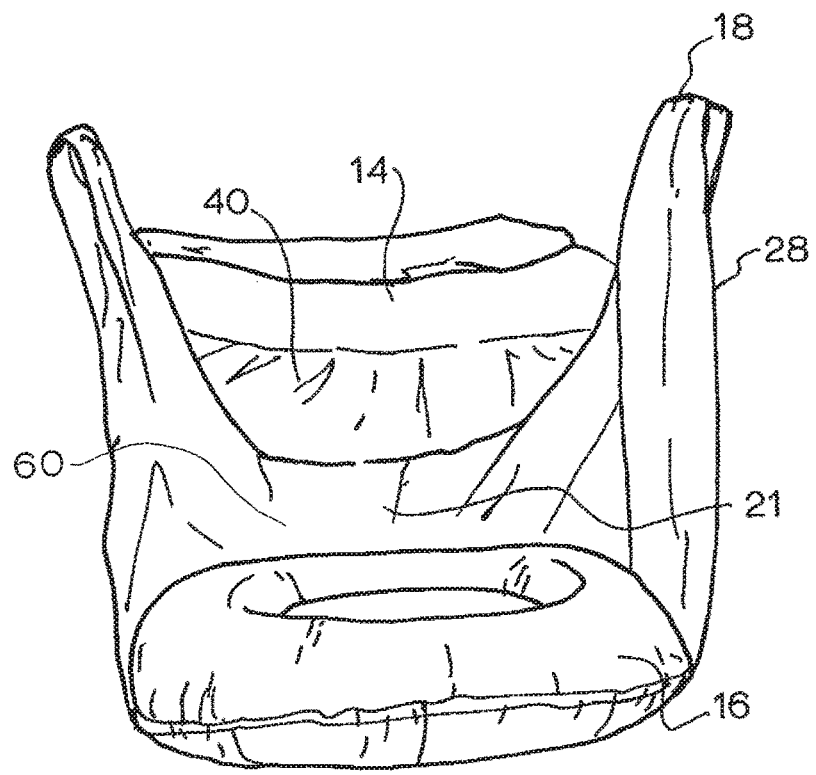
FIG. 9 shows a front view of the support of FIG. 6.

As previously described, the device 10 preferably further comprises at least one removable pillow 16 sized and configured to be retained on the floor 20 of the recess 60 to provide comfort for the user 34 and to provide a means to retain an open structure of the recess 60. The pillow 16 retains an open space so that the user 34 can move their legs more freely when the device 10 is in use. FIG. 4 best exemplifies the way in which the pillow 16 holds the recess open. The pillow 16 is preferably inflatable to adjust the size and/or softness of the pillow as desired by the user. In some embodiments the pillow 16 may be securely fixed to the floor 20 of the body of the device 10.

In the preferred embodiment, the relative positions of the complementary attachment members 18 and 24 are adjustable to adjust the positon, and in particular the vertical position or height, of the floor 20 of the recess 60 relative to the support structure. In the preferred embodiment, the floor 20 and recess 60 are suspended above the floor of the vehicle in a majority of the adjustment positions in use. In one or more adjustment positions the floor 20 may rest on the floor of the vehicle. The adjustment positions may be discrete or continuous. In some embodiments the relative position between members 18 and 24 is non-adjustable.

In use, a user's foot and/or leg lies on the pillow 16 or floor 20. Due to the slight lifting of the foot or leg 36 off the ground the user is placed in a more comfortable seating position. Besides the positioning of the foot, the pillow also relieves pressure from the bottom of the foot, enhancing user comfort. This is particularly appealing for travelers who spend extended periods of time sitting, for example on trains or planes. In addition to the comfort provided the leg and foot support 10 also reduces the swelling of the user's feet and legs. Sitting for extended periods can reduce blood flow in veins of the legs both due to constant pressure and reduced motility. Raising the legs can reduce this pressure and therefore may reduce the risk of DVT.

To achieve the first support form, a user can fold both lateral wings 19 inwardly towards one another to an erect position where they are preferably substantially orthogonal to the front part 20 of the central body portion. The straps 18 can then be looped around the support structure and coupled to the complementary attachment members 24 at the desired position. The tail section 14 can then be extended over the user's seat for a user to sit on and fix in place, thus opening up the recess 60 and allowing the user to rest their leg and or foot therein. One or more pillows 16 can be removably inserted into the recess to enhance comfort.

In the first preferred embodiment the main body is adjustable in form into either the first support form described above or a second support form. The form of the device can be adjusted in situ. Referring to FIGS. 6-10 in the second support form, a rest or platform 40 is also provided in addition to the recess 60 at a higher position than the floor 20 of the recess 60. In the second support form a user has the option of positioning their leg and/or foot on the higher level platform 40 only and/or as well as within the recess 60. The platform 40 is provided by an inner end of the tail section 14 adjacent the recess 60 and locates between the recess and the user's seat in situ. A general orientation of the platform 40 is preferably approximately parallel with the general orientation of the seating surface of the user's seat or floor of the recess 60.

In order to achieve the second form the straps 18 are placed over the support structures 32 as they were for the first form, but they are attached to the sidewalls 19 at second complementary attachment members 26, extending along top edges 30 of the sidewalls 19. This tensions the upper edges 30 of the side walls 19 to provide support and lift up the inner end of the tail section 14. The complementary attachment members 18 and 26 therefore provide tension between the front of the recess 60 and the inner end of the tail section 14. Further, the tail section 14 is positioned such that the inner end 40 is left suspended over the front of the seat 22 in use. The inner end 40 becomes a raised rest or platform 40. The tail section 14 is still maintained in its position by the weight of the user 34 and/or other necessary attachments, when in use. With the straps 18 attached to the sidewalls 19 in this fashion the raised platform 40 becomes a sling like structure that can be tensioned or loosened by adjusting the position of the tail section relative to the seat 22.

In the preferred embodiment, the relative positions of the complementary attachment members 18 and 26 are adjustable to adjust the length of the platform 40. The adjustment positions may be discrete or continuous. In some embodiments the relative position between members 18 and 26 is non-adjustable.

The base of the raised platform 40 is at a higher level than the floor 20 and/or pillow 16 in use. One or more pillows or cushions may be removably or fixedly placed on the platform 40 in some embodiments. In the second support form of the first preferred embodiment, the user is able to raise their knees 37 as shown in FIG. 10 which may provide further comfort and/or may provide a relieving variation in seating position to the traveler, especially for those that find sitting in compact position more comfortable.

The combination of the first form and second form provide many alternatives to the user during their time in the seated position. Travelling for extended periods sitting in one position can be uncomfortable even if relieved by the raising of the user's foot or leg. If a person is able to change from one comfortable seating position to another, travel discomfort can be minimized. The first form and the second form provide these various alternative seating positions.

Figure 14:
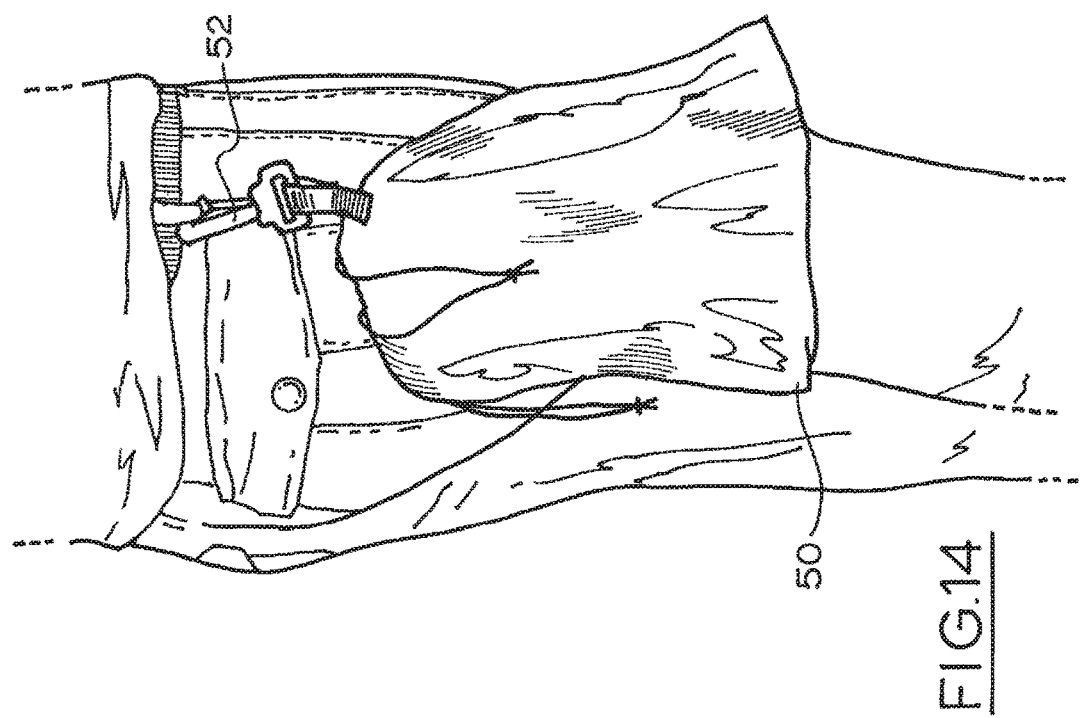
FIG. 14 shows the support device in the carry bag of FIG. 13 attached to a belt loop.
Figure 13:
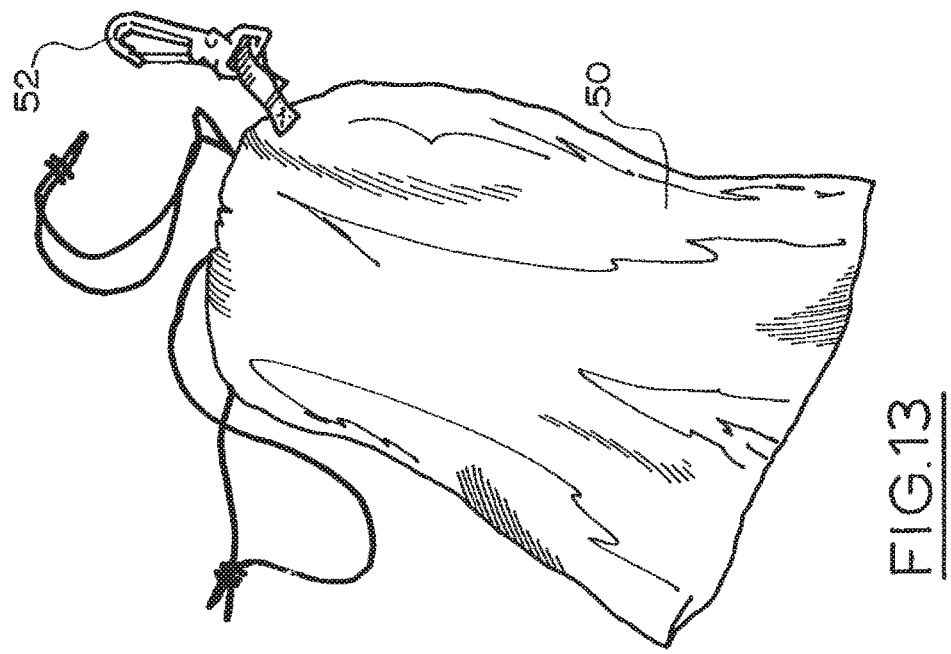
FIG. 13 shows an isometric view of the support device of the invention contained in a carry bag.

As described above, the main body is preferably formed from a light weight, flexible and durable material. Accordingly, the main body may be rolled, folded or otherwise compacted to a substantially compact and portable size for transporting the device with ease. FIGS. 13 and 14 show the device 10 in a compacted state. A bag 50 is provided for retaining the body therein for transport. A quick release connecting device 52 is fixedly attached to the bag 50. The quick release connecting device 52 can be easily removably attached to a belt loop 54 as shown in FIG. 14. The quick release connecting device 52 can also be attached to a piece of luggage or the like (not shown). In its transportable form the device 10 is light weight and compact and can be carried around easily. The one or more pillows 16 may also be deflatable and compactable to be retained within the same bag 50.

Referring now to FIGS. 15 to 21, a second preferred embodiment of the device 10 will now be described. In the second preferred embodiment the main body can be adjusted or manipulated into at least one support form and into a carry bag form.

For the second preferred embodiment, as shown in FIG. 15, the structure and shape of the main body is the same as in the first preferred embodiment. The structure will therefore not be described in further detail and the same numerals will be used to describe the same portions, parts or sections of that structure. Furthermore, preferably in the second embodiment, the main body is adjustable between a first support form and a second support form as described for the first embodiment. As such, the recess 60 of the first and second forms and the platform 40 of the second form will not be described again in detail. It will be appreciated however that in some variations of the second embodiment, the main body may only provide a reconfiguration into one of the support forms, by for example only providing one of the attachment members 24 or 26 at the side walls 19.

Figure 16:
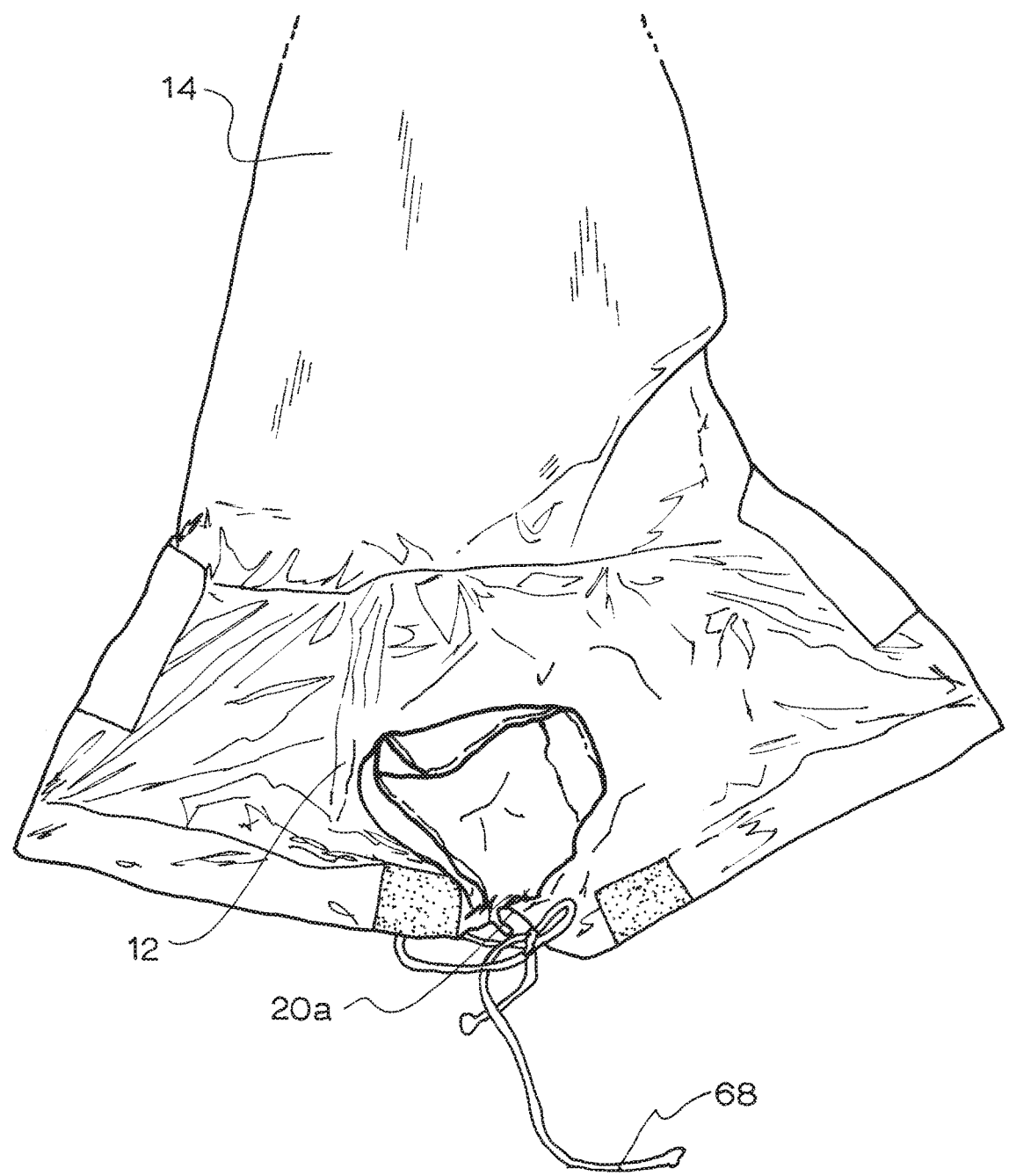

In the second preferred embodiment, the main body is further adjustable into a carry bag or pouch form. To achieve this, the main body is modified in the second preferred embodiment such that the front part 20 of the central body portion of the main body is adjustable in length along an outer peripheral edge 20a of the part. Referring to FIG. 15, a draw string 68 is preferably provided through a seam along the edge 20a for example to achieve this lengthening and shortening of the length of the leading edge 20a of front part 20. The edge 20a is preferably fixedly adjustable between an extended position (shown in FIG. 15) for use of the main body as a support and a shortened position (shown in FIG. 16) for use of the main body as a pouch (sometimes in addition to a support). The draw string is tied to fix the edge in the shortened position as shown in FIG. 16. Other adjustment mechanisms may be provided in alternative embodiments.

Figure 17:
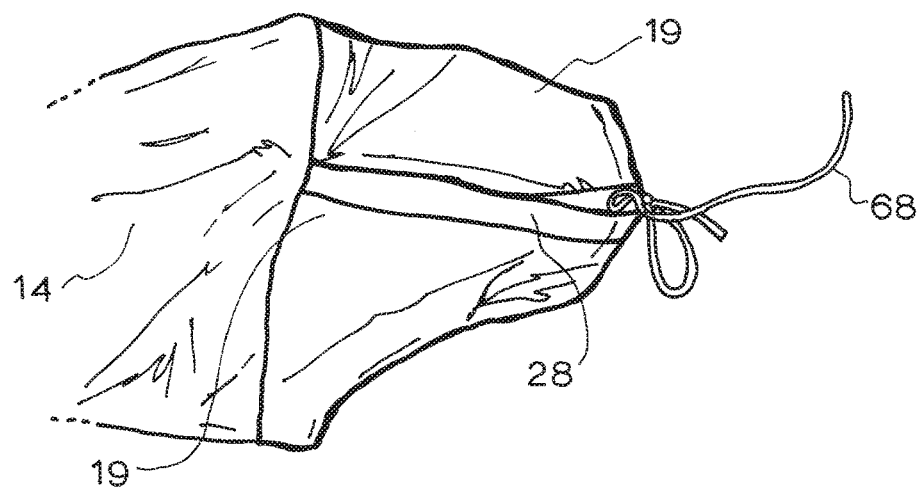
Figure 19:
Figure 20:
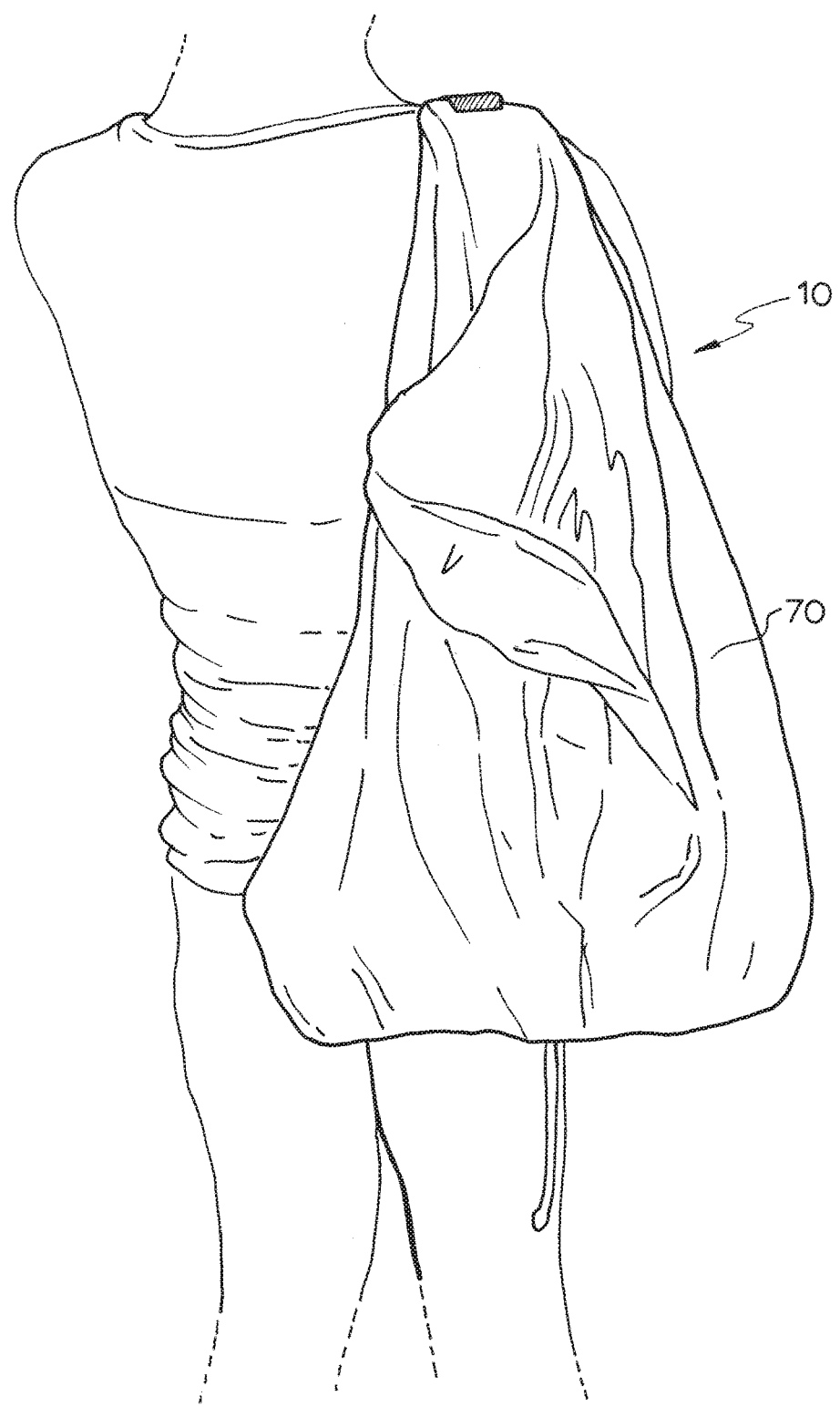

To achieve the carry bag or the pouch form of the device, the main body is manipulated in the following manner. The edge 20a is shortened in length to draw the lateral wings 19 towards one another at a front end of the wings (FIG. 16). The lateral wings 19 are then inwardly folded towards one another and collapsed onto the central body portion where their respective edges 28 are substantially aligned (FIG. 17). A fixing mechanism (not shown) is provided to the device 10 to releasably couple the edges 28 of the wings 19. This forms a receptacle or pouch 70 as shown in FIG. 18 that is capable of retaining one or more user items therein. The pouch 70 is bounded by a floor and an inner peripheral wall formed by the front and rear parts 20 and 21 of the central body portion of the main body and wings portions 19. The tail section 14 can be folded into the pouch and over the retained item(s) to cover, protect and/or retain the item(s) in the pouch as shown in FIG. 19. The device may further comprise one or more straps (preferably removable) to allow the pouch to be carried over the shoulder, arm or in the hands of the user for transporting the items as shown in FIG. 20.

Figure 21:
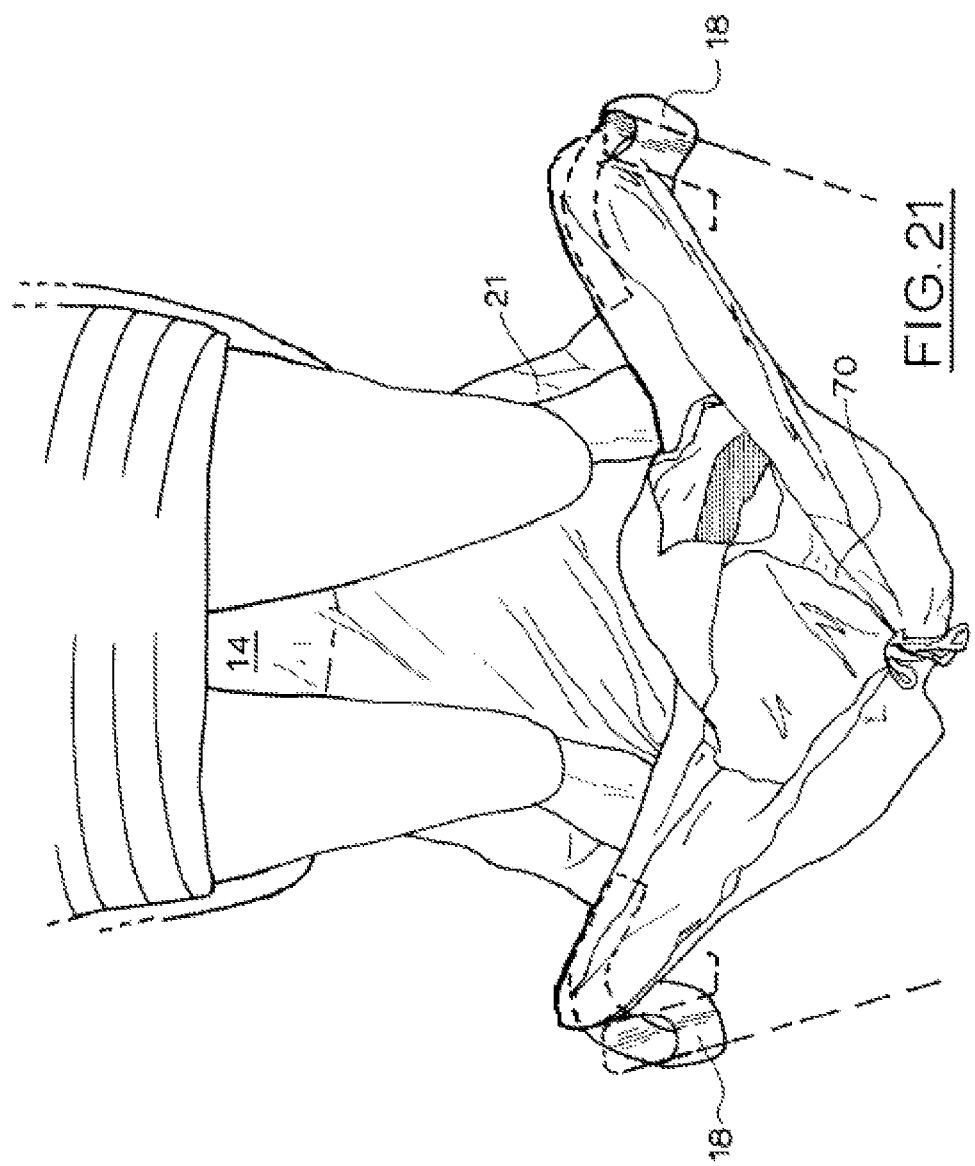
FIG. 21 shows the use of a pouch of the support device of FIG. 15 in a support form of the device.

The provision of an edge 20a that is adjustable in length also means that the recess 60 may be turned into a pouch 70 having a front wall 71 extending from the floor 20 for storing item(s) when the device 10 is in the second support form as shown in FIG. 21. The addition of a front wall 71 extending from the floor 20 of the pouch 70 helps to retain item(s) within the receptacle/pouch 70. The platform 40 is still usable as a foot and/or leg rest making the device multi-purpose in this configuration.

Figure 22:
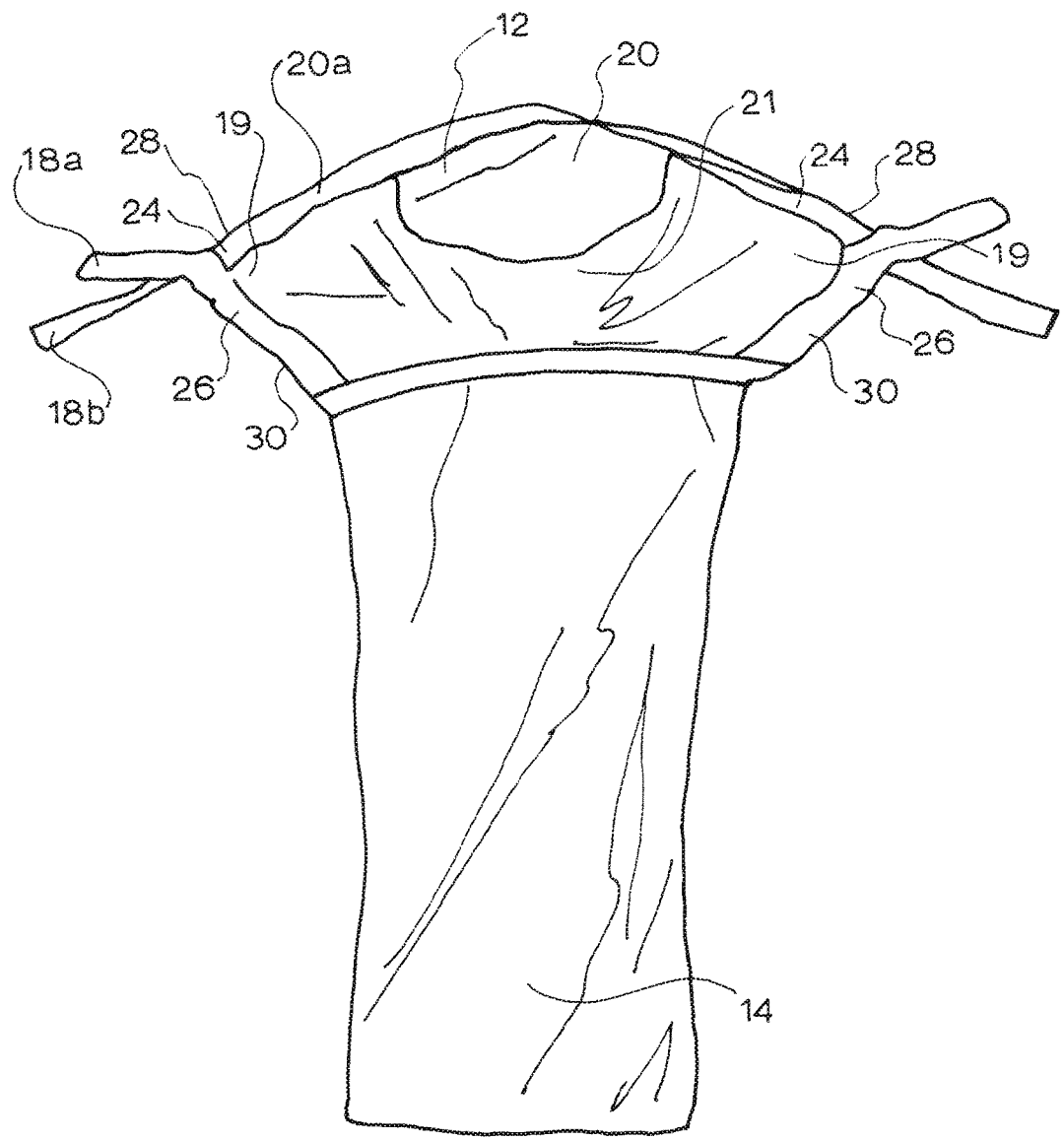
FIG. 22 shows a plan view of a support device of a third embodiment in an unassembled or spread out state.

Referring to FIG. 22, in a third preferred embodiment a pair of attachment straps 18a and 18b are provided on either side of the body. In this embodiment a secondary strap is provided to strengthen the connection between the device and the support structure for heavier users. In particular, a relatively longer primary strap 18b is provided to attach to either corresponding attachment member 24 or 26 and manipulate the form of the device into either the first or second support form respectively as previously described, and a secondary strap 18a is also provided for attachment to the other corresponding attachment member 26 or 24 to strengthen the connection about the support structure in use. This feature of the third embodiment can be provided with any other feature of the first or second embodiment.

It will be appreciated that in any of the embodiments described, the size of the main body is dependent on the application and one or more different sizes may be provided for different users, such as adults and children. The length of the adjustment members 18, 24 and 26 may also vary depending on the size of the main body and/or application. In a children's version of the device 10, the second support form may enable a child to lie across the seat and platform 40. One or more pillows may be provided on platform 40 to maintain a level structure for the child to rest upon. It is particular advantageous that the second preferred embodiment is utilized for the children's version of the device as the pouch 70 can be used in the second support form to retain a child's items while they rest upon the created platform 40 and seat.

The device 10 is light weight and flexible. This allows for easy maneuverability when in use and is therefore able to be set in many and varied positions that provide most comfort for the user with very little effort.

The foregoing description of the invention includes preferred forms thereof. Modifications may be made thereto without departing from the scope of the invention as defined by the accompanying claims.

The invention claimed is:

1. A seating support device for use in conjunction with a seat to support a user during a sitting position in situ, the seating support device comprising:
a main body of flexible material that is capable of being manipulated to alter a three dimensional form of the body into one of multiple usable forms, the main body including a front section having a central body portion and a pair of lateral wings extending from first and second sides of the central body portion, and a tail section extending longitudinally from one end of the central body portion, each wing of the pair of lateral wings including a first outer edge extending obtusely from an outer leading edge of the front section of the main body and a second outer edge extending from a terminal end of the first edge towards the tail section, and wherein the multiple usable forms includes a first support form and a second support form, in the first support form, the central body portion includes a recess for retaining a user's foot and/or leg therein and in the second support form, the central body portion includes the recess for the user to rest their leg and/or foot therein and an adjacent platform at a relatively higher position than a floor of the recess for the user to rest their leg and/or foot thereon, wherein the platform is formed by an inner end of the tail section adjacent the central body portion and approximately parallel with a general orientation of a seating surface of the seat supporting the user or the floor of the recess, such that the platform is suspended over a front of the seat supporting the user,
an attachment mechanism associated with the main body for attaching the main body to a support structure separate from the seating surface of the seat supporting the user in the first support form and the second support form, and
wherein the main body is also configured to couple to the seat supporting the user by the user sitting on the tail section.

2. The seating support device as claimed in claim 1 wherein the main body includes an attachment mechanism associated with each lateral wing of the pair of lateral wings for coupling each lateral wing of the pair of lateral wings to the support structure.

3. The seating support device as claimed in claim 2 wherein the attachment mechanism includes a first attachment member associated with each wing of the pair of lateral wings and the attachment mechanism is configured to couple to one of two second attachment members on each wing of the pair of lateral wings to form a first connection or a second connection respectively and, in use, the main body can be manipulated between the first support form and the second support form by altering the attachment mechanism between the first connection and the second connection.

4. The seating support device as claimed in claim 1 wherein in both the first support form and the second support form, the main body is configured to couple to the support structure at one end of the main body via the attachment mechanism associated with each wing of the pair of lateral wings and at an opposing end of the main body, the main body is configured to couple to the seat supporting the user via the tail section.

5. The seating support device as claimed in claim 1 wherein a position of the first connection and/or a position of the second connection is adjustable by adjusting a position of the first attachment member relative to the position of the second attachment members.

6. The seating support device as claimed in claim 5 wherein the two second attachment members of each of the attachment mechanisms are oriented at an angle relative to one another.

7. The seating support device as claimed in claim 6 wherein the two second attachment members of each of the attachment mechanisms are respectively positioned along respective first and second outer edges of an associated wing of the pair of lateral wings.

8. The seating support device as claimed in claim 1 wherein in the first support form and the second support form, an anterior part of the recess is open.

9. The seating support device as claimed in claim 1 wherein the main body further includes an adjustment mechanism associated with a leading edge of the main body for adjusting a length of the leading edge to thereby aid in manipulating the main body into a carry bag or a pouch form.

10. The seating support device as claimed in claim 9 wherein in the carry bag or the pouch form, the main body includes a pouch bounded by the pair of lateral wings and the central body portion.

11. The seating support device as claimed in claim 10 wherein in the carry bag or the pouch form, the tail section can be utilized as a cover by folding the tail section over one or more items to be retained in the pouch.

12. The seating support device as claimed in claim 11 wherein the device further includes a releasable fixing mechanism for releasably coupling respective edges of the first and second outer edges of the pair of lateral wings in the carry bag or the pouch form.

13. The seating support device as claimed in claim 12 wherein the device further includes a strap for enabling a user to carry the pouch over a shoulder and/or arm of the user in the carry bag or the pouch form.

14. The seating support device as claimed in claim 1 wherein the main body is formed from a substantially flexible and durable material such that the main body is foldable, rollable or otherwise compactable and the device further includes a bag for retaining and transporting the main body in a compacted form.

15. The seating support device as claimed in claim 1 wherein the device further includes one or more pillows configured to be supported within the recess or on a the platform or both.

16. A seating support device for use in conjunction with a seat to support a user during a sitting position in situ, the seating support device comprising:
a main body of flexible material manipulatable to alter a three dimensional form of the main body into one of multiple usable forms, the main body includes a front section having a central body portion and a pair of lateral wings extending from first and second sides of the central body portion, and a tail section extending longitudinally from one end of the central body portion, wherein each wing of the pair of lateral wings includes a first outer edge extending obtusely from an outer edge of the front section of the main body and a second outer edge extending from a terminal end of the first outer edge towards the tail section, and wherein the multiple usable forms include a first support form and a second support form, in the first support form, the central body portion includes a recess for retaining a user's foot and/or leg therein and in the second support form, the central body portion includes the recess for the user to rest their leg and/or foot therein and an adjacent platform at a relatively higher position than a floor of the recess for the user to rest their leg and/or foot thereon, wherein the platform is formed by an inner end of the tail section adjacent the central body portion, such that the platform is suspended over a front of the seat supporting the user, an attachment mechanism associated with each wing of the pair of lateral wings for attaching the main body to a support structure separate from a seating surface of the seat supporting the user in the first support form and the second support form, wherein the attachment mechanism includes a first attachment member associated with each wing of the pair of lateral wings and configured to couple to one of two second attachment members located on the first outer edge and the second outer edge of each wing of the pair of lateral wings to form a first connection or a second connection respectively and, in use, the main body is manipulated between the first form and the second support form by altering the attachment mechanism between the first connection and the second connection, and wherein the main body is also configured to couple to the seat supporting the user by the user sitting on the tail section.

17. The seating support device as claimed in claim 16 wherein the recess includes a floor and an inner peripheral wall for bounding the users legs and/or feet therein, the inner peripheral wall includes two lateral side walls formed by the lateral wings, and a rear wall formed by a rear part of the central body portion, the rear wall extending approximately orthogonally between the lateral side walls.

18. The seating support device as claimed in claim 17 wherein in the first support form and the second support form, an anterior part of the recess is open at least adjacent the floor of the recess to enable the user to extend their foot and/or leg beyond the recess.

19. The seating support device as claimed in claim 16 wherein the first attachment member associated with each wing of the pair of lateral wings is adapted to loop around a part of the support structure and couple to one of two second attachment members located on the first outer edge and the second outer edge of each wing of the pair of lateral wings to fix the main body at the first side and the second side of the central body to the support structure.

20. The seating support device as claimed in claim 19 wherein a position of the first connection and/or a position of the second connection is adjustable by adjusting a position of the first attachment member relative to the position of the second attachment members to adjust a vertical position of the floor of the recess.

* * * * *